US012773066B2

(12) United States Patent
Zhang

(10) Patent No.: US 12,773,066 B2
(45) Date of Patent: Oct. 27, 2026

(54) FOLDABLE BRAZIER

(71) Applicant: Ningbo Hooya Imp. & Exp. Group Co., Ltd., Ningbo (CN)

(72) Inventor: Garrison Zhang, Ningbo (CN)

(73) Assignee: Ningbo Hooya Imp. & Exp. Group Co., Ltd., Ningbo (CN)

( * ) Notice: Subject to any disclaimer, the term of this patent is extended or adjusted under 35 U.S.C. 154(b) by 437 days.

(21) Appl. No.: 18/244,089

(22) Filed: Sep. 8, 2023

(65) Prior Publication Data

US 2025/0017418 A1 Jan. 16, 2025

(30) Foreign Application Priority Data

Jul. 12, 2023 (CN) ......................... 202321815481.2

(51) Int. Cl.

| | |
|---|---|
| ***A47J 37/07*** | (2006.01) |
| ***F24B 3/00*** | (2006.01) |
| ***F24C 1/16*** | (2021.01) |

(52) U.S. Cl.

CPC ............. *A47J 37/0704* (2013.01); *F24B 3/00* (2013.01); *F24C 1/16* (2013.01); *A47J 2037/0777* (2013.01)

(58) Field of Classification Search

CPC . A47J 37/0704; A47J 2037/0777; F24B 3/00; F24C 1/16

USPC .......................................................... 126/9 B

See application file for complete search history.

(56) References Cited

U.S. PATENT DOCUMENTS

| | | | | |
|---|---|---|---|---|
| 2,424,665 A * | 7/1947 | Pope, Sr. | ................ | F24B 1/205 220/6 |
| 4,455,992 A * | 6/1984 | Hsiao | ...................... | F24B 1/205 126/9 R |
| 5,711,210 A * | 1/1998 | Kaufman | .................. | F24C 1/16 99/449 |
| 10,022,016 B1 * | 7/2018 | Streett | ...................... | B60P 3/36 |

(Continued)

FOREIGN PATENT DOCUMENTS

| | | | | |
|---|---|---|---|---|
| CN | 217937971 U | 12/2022 | | |
| DE | 102017003211 A1 * | 9/2018 | .......... | A47J 37/0704 |

(Continued)

OTHER PUBLICATIONS

German to English machine translation of DE_102017003211_A1.*
Korean to English machine translation of KR-20150003736-U.*

*Primary Examiner* — Michael G Hoang
*Assistant Examiner* — Elizabeth Ann Laughlin
(74) *Attorney, Agent, or Firm* — TROUTMAN PEPPER LOCKE LLP

(57) ABSTRACT

The disclosed apparatus and systems relate to a foldable brazier which is portable for ease of indoor and outdoor usage. The foldable brazier can include comprising a first section and a second section comprising a third section and a fourth section The foldable brazier can have a folded configuration in which the two foldable sidewalls are collapsed and are positioned between the first and second straight sidewalls. The foldable brazier can have an unfolded configuration in which the first section and the second section are substantially coplanar, the third section and the fourth section are substantially coplanar, and the bottom section is attached to at least two of the first straight sidewall, the second straight sidewall, the first foldable sidewall, and the second foldable sidewall.

3 Claims, 8 Drawing Sheets

(56) References Cited

U.S. PATENT DOCUMENTS

| | | | | |
|---|---|---|---|---|
| 2008/0087176 | A1* | 4/2008 | Qayyeumi | A47J 37/0704 99/450 |
| 2017/0095114 | A1* | 4/2017 | O'Shaughnessy | B62B 3/02 |
| 2017/0367533 | A1* | 12/2017 | Ebersold | A47J 37/0763 |
| 2021/0002919 | A1* | 1/2021 | Camillo | B62B 5/0013 |
| 2021/0095852 | A1* | 4/2021 | Jones | F24C 1/16 |
| 2022/0257054 | A1* | 8/2022 | Ashford | F24C 5/20 |

FOREIGN PATENT DOCUMENTS

| | | | | |
|---|---|---|---|---|
| KR | 20150003736 | U * | 10/2015 | A47J 37/0694 |
| WO | WO-2005037034 | A2 * | 4/2005 | A47J 37/0763 |

* cited by examiner

FOLDABLE BRAZIER

TECHNICAL FIELD

Aspects of the present disclosure relate to a foldable brazier and foldable brazier system or portions thereof, and more particularly, to a portable brazier comprising a folded configuration for ease of storage and transport.

BACKGROUND

As outdoor activities became more popular, there has been a rising demand for outdoor products. A brazier is one outdoor product that provide a number of functionalities. For example, a brazier can provide a portable heating element for outdoor camp sites, or it can also be used to boil water and heat food, for example as a barbeque. The larger the brazier, the more useful it can be for heating and/or cooking. Therefore, people may prefer a larger size for a more efficient heating or when a larger number of people need to be served.

However, many existing braziers are not portable and/or modular. Therefore, a larger brazier will occupy a larger space, such as the precious trunk space of a vehicle. Even non-portable braziers may be able to be disassembled into several pieces, which may be re-assembled at a different site. But the disassembly and re-assembly are complicated and time consuming. Moreover, such complex process also requires additional tools, which means a user needs to bring more items for an outdoor activity. This makes the user's must-have list longer for an outdoor activity. Also, if the user unfortunately forgets the necessary tools, the disassembled brazier will be un-usable.

These and other problems are addressed or at least alleviated by the technology disclosed herein.

SUMMARY

Accordingly, the inventors of this disclosure have recognized that there is a need for the following solution. Embodiments of the present disclosure address these concerns as well as other needs that will become apparent upon reading the description below in conjunction with the drawings. Briefly described, aspects of the present disclosure relate to a foldable brazier for indoor and outdoor usage, and more particularly, being portable in a folded configuration to save the space for storing the brazier.

One aspect of the present disclosure provides a foldable brazier. The foldable brazier can include a bottom assembly and a sideboard assembly. The sideboard assembly can include two oppositely arranged foldable surfaces and two oppositely arranged side surfaces. The foldable surfaces and the side surfaces can be arranged alternatively. The foldable surfaces and the side surfaces can hingeably connected via corner hinges. The foldable surfaces can include two partial walls being hingeably connected with wall hinges, wherein the bottom assembly is engageable with the sideboard assembly.

Another aspect of the present disclosure provides a foldable brazier. The foldable brazier can include a first straight sidewall and a second straight sidewall. The foldable brazier can include a first foldable sidewall which can include a first section and a second section hingeably connected to each other via a first wall hinge. The foldable brazier can include a second foldable sidewall which can include a third section and a fourth section hingeably connected to each other via a second wall hinge. The foldable brazier can include a removable bottom section. The first section can hingeably connected to the first straight sidewall via a first corner hinge. The second section can hingeably connected to the second straight sidewall via a second corner hinge. The third section can hingeably connected to the first straight sidewall via a third corner hinge. The fourth section can hingeably connected to the second straight sidewall via a fourth corner hinge. The foldable brazier can have a folded configuration wherein the two foldable sidewalls are collapsed at the first and second wall hinges and are positioned between the first and second straight sidewalls. In some embodiments, the foldable brazier can have an unfolded configuration. In the unfolded configuration, the first section and the second section are substantially coplanar and the third section and the fourth section are substantially coplanar. In the unfolded configuration, the bottom section can be attached to at least two of the first straight sidewall, the second straight sidewall, the first foldable sidewall, and the second foldable sidewall.

Another aspect of the present disclosure provides a foldable brazier system. The foldable brazier system can include a foldable brazier. The foldable brazier can include a first straight sidewall which can include one or more bracket apertures. The foldable brazier can include a second straight sidewall which can include one or more bracket apertures. The foldable brazier can include a first foldable sidewall which can include a first section and a second section hingeably connected to each other via a first wall hinge. The first section can be hingeably connected to the first straight sidewall via a first corner hinge, and the second section can be hingeably connected to the second straight sidewall via a second corner hinge. The first foldable sidewall can further include one or more bracket apertures. The foldable brazier can include a second foldable sidewall which can include a third section and a fourth section hingeably connected to each other via a second wall hinge. The third section can be hingeably connected to the first straight sidewall via a third corner hinge, and the fourth section can be hingeably connected to the second straight sidewall via a fourth corner hinge. The second foldable sidewall can further include one or more bracket apertures. The foldable brazier can include a removable bottom section. The foldable brazier system can include a base. The base can include a plurality of corner brackets, wherein each corner bracket can include a first corner tab and a second corner tab. The first corner tab can be sized and shaped to engage with one bracket aperture, and the second corner tab can be sized and shaped to engage with one bracket aperture. Each of the plurality of corner brackets can be positioned on the base such that their respective first corner tab and second corner tab can straddle one of the first corner hinge, the second corner hinge, the third corner hinge, or the fourth corner hinge.

The present disclosure will be more fully understood from the following detailed description of embodiments thereof, taken together with the drawings.

BRIEF DESCRIPTION OF THE FIGURES

Reference now will be made to the accompanying figures, which are not necessarily drawn to scale, and wherein.

DETAILED DESCRIPTION

Figure 1:
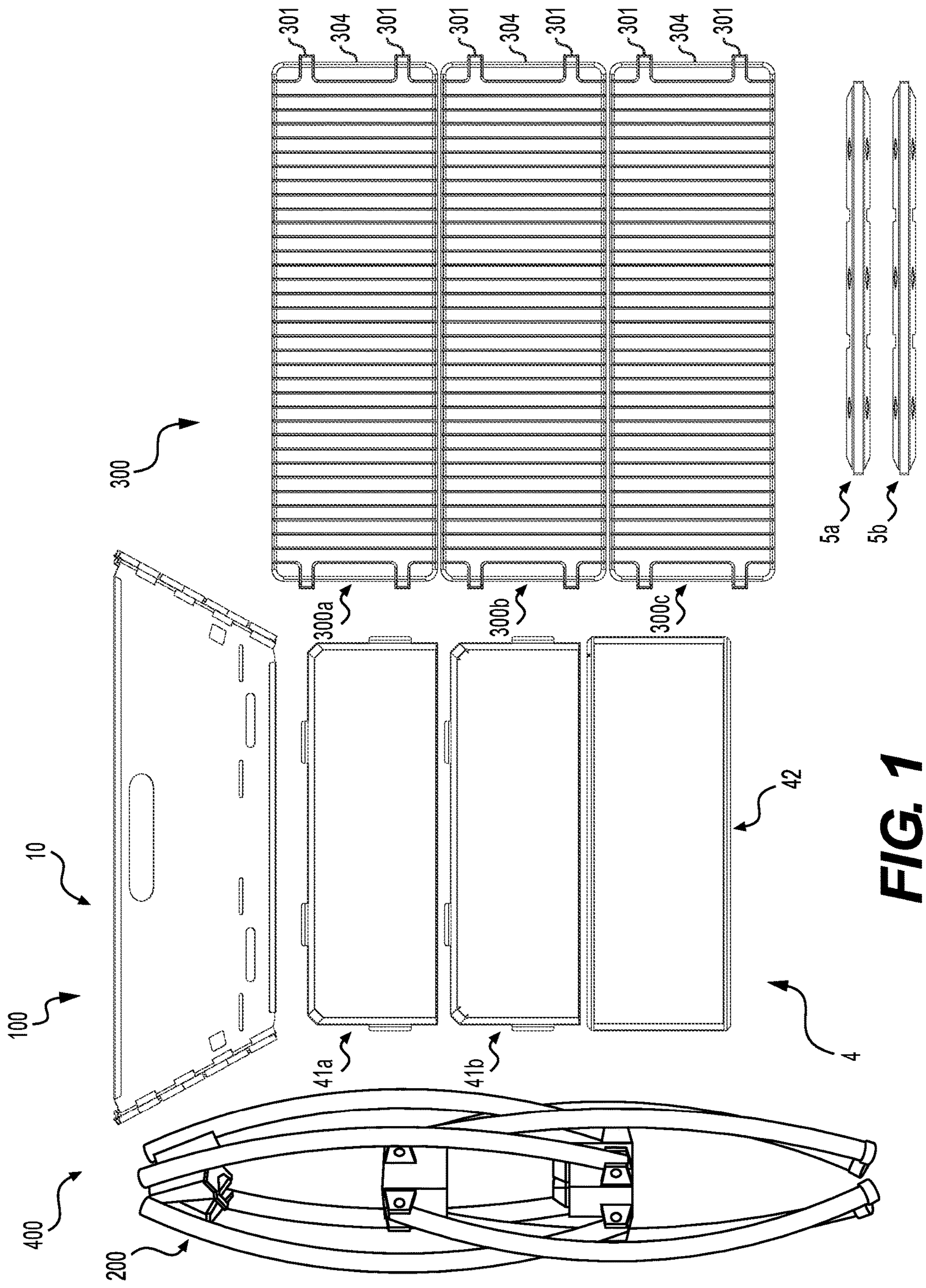
FIG. 1 shows an example disassembled foldable brazier system, according to an example embodiment of the present disclosure.

The present disclosure can be understood more readily by reference to the following detailed description of exemplary embodiments and the examples included herein. Before the exemplary embodiments of the apparatus and systems according to the present disclosure are disclosed and described, it is to be understood that embodiments are not limited to those described within this disclosure. Numerous modifications and variations therein will be apparent to those skilled in the art and remain within the scope of the disclosure. It is also to be understood that the terminology used herein is for describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. But it is to be understood that embodiments of the disclosed technology may be practiced without these specific details. In other instances, well-known components, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to and are not intended to imply that the objects so described must be in a given sequence, either temporally, spatially, in ranking, or in any other manner.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

To facilitate an understanding of the principles and features of the embodiments of the present disclosure, exemplary embodiments are explained hereinafter with reference to their implementation in an illustrative embodiment. Such illustrative embodiments are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the disclosed technology, for example.

Embodiments of the disclosed technology include a foldable brazier for heating, cooking, and/or baking various types of food in various ways. The term brazier as used herein may refer to any suitable container that being used for providing a heating source. As will be appreciated, a brazier can be used as a portable heater for holding lighted coals or wood. In some embodiments, the brazier or any part thereof can be fireproof and/or insulative. For example, in some examples, the fireproof and/or insulative features can come from one or more components being manufactured from a fireproof or insulative material (e.g., metal or ceramic), while in alternative examples components can be coated in a fireproof or insulative material. As will further be described herein (for example with respect to air openings 22), the foldable brazier is not airtight or watertight. In some embodiments, the brazier can also be particulate-tight, thereby limiting the spread of ash. For example, and as will be described below, the bottom assembly can be particulate-tight. The individual shell bodies (e.g., side shell bodies 41*a*, 41*b* and/or middle shell body 42) of the bottom assembly can overlap to prevent ash from escaping the bottom of the foldable brazier.

The present disclosure is not limited to a device only for providing heat for an environment, however, as many of the examples provided herein can provide additional features usable for cooking and grilling so as to prepare solid or semi-solid food or liquid. For example, and not limitation, the foldable brazier can be used with a grill plate set for barbeque. In another example, the foldable brazier can be used with a pot hung or hooked above for cooking or heating. Various cooking or heating appliances can be used with the foldable brazier, as long as the foldable brazier can be a suitable heating source or a heating container. Such brazier can be suitable for both indoor and outdoor usage. In various embodiments, a foldable brazier can be folded into a folded configuration and thus being portable. A variety of heating fuel can be used in the brazier, including but not limited to live coals, wood coals, wood briquettes, wood pellets, etc.

Figure 2:
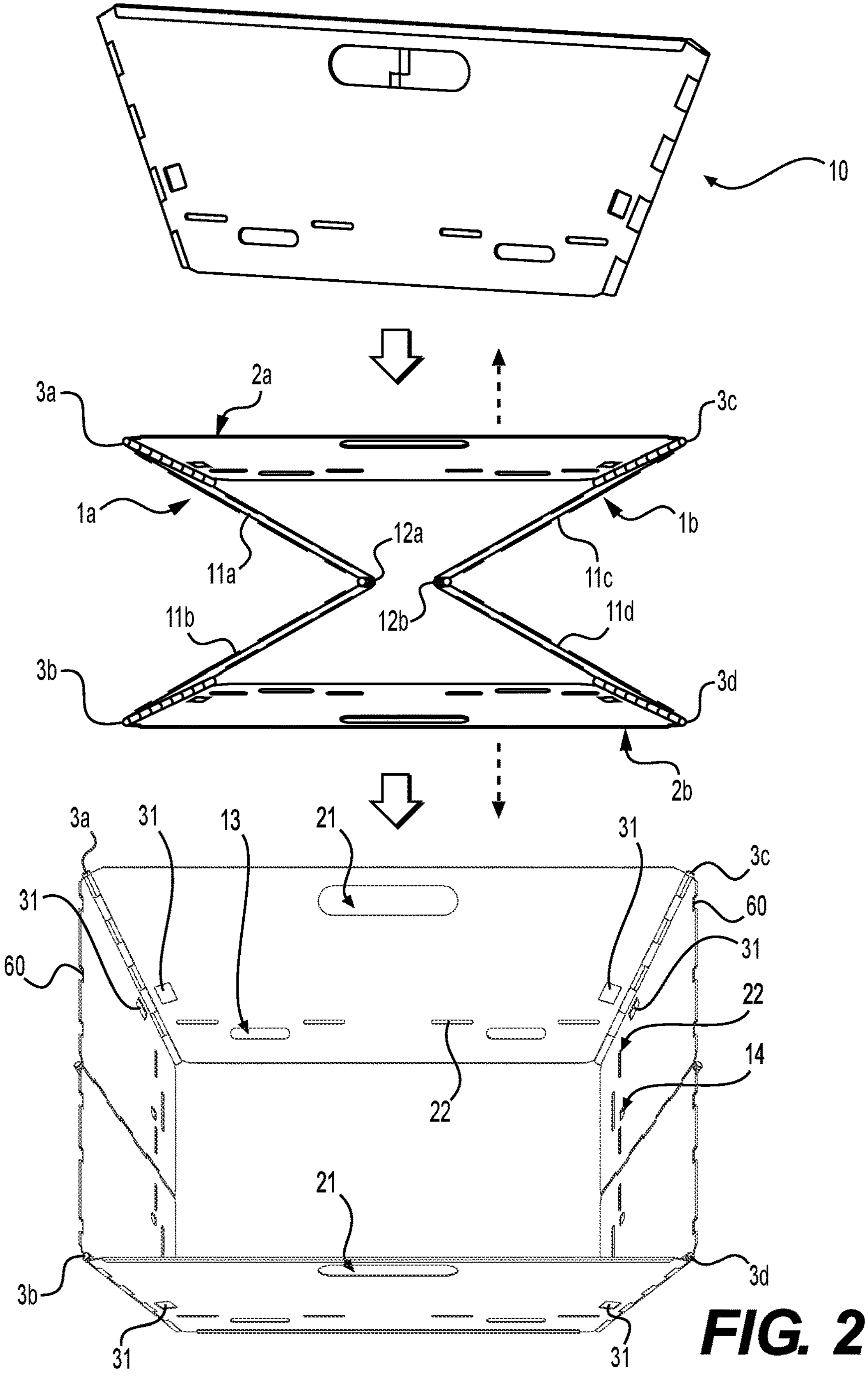
FIG. 2 shows an upper view of an example sideboard assembly of a foldable brazier, being unfolded from a folded configuration, to a partially unfolded configuration, and to a fully unfolded configuration, according to an example embodiment of the present disclosure.

Various apparatus and systems are disclosed for providing and using a foldable brazier, and exemplary embodiments of the apparatus and systems will now be described with reference to the accompanying figures. Reference numbers throughout the figures indicate that a particular feature or object is being referred to. FIG. 1 is an upper perspective view of an example foldable brazier system, according to an example embodiment of the present disclosure. As can be seen in FIGS. 1, 2, and 5, as compared to the unfolded configurations shown in FIGS. 3, 4, and 6-8, a benefit of the present apparatus and systems is that the foldable brazier system 400 can have a folded configuration and thus be folded into collapsed constituents: a portable brazier 100 and a base 200.

Referring again to FIG. 1, the foldable brazier system 400 can include the foldable brazier 100, the base 200, and a grill plate set 300. The foldable brazier 100 can include a bottom assembly 4 and a sideboard assembly 10. Hereinafter, the terms bottom assembly and removable bottom section are used interchangeably. The bottom assembly 4 can include side shell bodies 41*a* and 41*b*, which are also interchangeably called as a first side section 41*a* and a second side section 41*b* hereinafter. In some embodiments, the bottom assembly 4 can also include a middle shell body 42, which is interchangeably called an intermediate section 42 hereinafter. In some embodiments, the bottom assembly 4 can also include one or more support braces 5*a*, 5*b*. The sideboard assembly 10 can have a folded configuration, as illustrated in FIG. 1. The base 200 is illustrated in a folded configuration in FIG. 1. The grill plate set 300 can include a plurality of grill plates 300*a*, 300*b*, 300*c*. Each grill plate 300*a*, 300*b*, 300*c* can include opposite edges 302 and 304 (as further illustrated in FIG. 7). Each grill plate 300*a*, 300*b*, 300*c* can include one or more grill tabs 301. Throughout this disclosure, use of the term 'tab' will be understood to mean an extension that curves slightly downwardly so as to engage a corresponding opening or aperture and provide support to the relevant component of the brazier.

FIG. 2 shows an upper perspective view of an example sideboard assembly 10 of the foldable brazier 100. The sideboard assembly 10 can include foldable surfaces 1*a*, 1*b*, which are interchangeably called a first foldable sidewall 1*a* and a second foldable sidewall 1*b* hereinafter, respectively. The first foldable surface 1*a* can include partial walls 11*a*, 11*b*, which are interchangeably called a first section 11*a* and a second section 11*b* hereinafter, respectively. Similarly, the second foldable surface 1*b* can include partial walls 11*c*, 11*d*, which are interchangeably called a third section 11*c* and a fourth section 11*d* hereinafter. The partial walls 11*a*, 11*b*, 11*c*, 11*d* are hingeably connected via wall hinges. Specifically, the first section 11*a* and the second section 11*b* can be hingeably connected to each other via a first wall hinge 12*a*. The third section 11*c* and the fourth section 11*d* can be hingeably connected to each other via a second wall hinge 12*b*. The sideboard assembly 10 can include side surfaces 2*a*, 2*b*, which are interchangeably called a first straight sidewall 2*a* and a second straight sidewall 2*b*. The partial walls 11*a*, 11*b*, 11*c*, 11*d* are hingeably connected to the side surfaces 2*a*, 2*b* via corner hinges. As illustrated in FIG. 2, the first section 11*a* is hingeably connected to the first straight sidewall 2*a* via a first corner hinge 3*a*, the second section 11*b* is hingeably connected to the second straight sidewall 2*b* via a second corner hinge 3*b*. Similarly, the third section 11*c* is hingeably connected to the first straight sidewall 2*a* via a third corner hinge 3*c*, and the fourth section 11*d* is hingeably connected to the second straight sidewall 2*b* via a fourth corner hinge 3*d*. In some embodiments, each side surface 2*a*, 2*b* can include a gripping opening 21. In some embodiments, each foldable surface 1*a*, 1*b* can include a gripping opening 21. In some embodiments, each foldable surface 1*a*, 1*b* and each side surface 2*a*, 2*b* can include a gripping opening 21. The gripping opening 21 can allow a user to grasp and thus lift the sideboard assembly 10 easily as needed. The foldable surfaces and side surfaces can include one or more air openings 22 to facilitate air circulation to the fuel (e.g., coal, wood, etc.) placed inside the assembled brazier. The foldable surfaces 1*a*, 1*b* and side surfaces 2*a*, 2*b* can include one or more bottom support openings 13 which will be described in conjunction with FIG. 3. The foldable surfaces 1*a*, 1*b* and side surfaces 2*a*, 2*b* can include one or more bracket apertures 31 which will be described in conjunction with FIG. 6. The foldable surfaces 1*a*, 1*b* and side surfaces 2*a*, 2*b* can include one or more grill tab notches 60 which will be described in conjunction with FIG. 7.

Referring again to FIG. 2, the sideboard assembly 10 can have a folded configuration. In such folded configuration, the two foldable sidewalls 1*a*, 1*b* are collapsed at the first wall hinge 12*a* and second wall hinge and are positioned between the first straight sidewall 2*a* and second straight sidewall 2*b*. As illustrated on the top of FIG. 2, in such folded configuration, only one side surface 2*a* is seen from an upper perspective view of the sideboard assembly 10. Then by pulling the side surfaces 2*a* and 2*b* toward opposite directions as shown in dashed arrows in FIG. 2 respectively, the sideboard assembly 10 is unfolded gradually. At a fully unfolded configuration, the first section 11*a* and the second section 11*b* can be substantially coplanar, and the third section 11*c* and the fourth section 11*d* can be substantially coplanar. As illustrated in FIG. 2, when folding the sideboard assembly 10 from the unfolded configuration to the folded configuration, a user may push the side surfaces 2*a*, 2*b* inwardly, toward each other. The foldable surface 1*a* can be collapsed and thus being folded inwardly around the wall hinge 12*a*, between the side surfaces 2*a* and 2*b*. When the sideboard assembly 10 is folded into a full folded configuration, the partial walls 11*a* and 11*b* can be substantially parallel. Similarly, the foldable surface 1*b* can be collapsed and thus being folded inwardly around the wall hinge 12*b*, between the side surfaces 2*a* and 2*b*. When the sideboard assembly 10 is folded into a full folded configuration, the partial walls 11*c* and 11*d* can be substantially parallel. In some embodiments, when folding the sideboard assembly 10 from an unfolded to a folded configuration, the foldable surface 1*a* can be collapsed and thus being folded outwardly around the wall hinge 12*a*. During such folding process, the partial wall 11*a* gradually be coplanar with the side surfaces 2*a*, and the partial wall 11*b* gradually be coplanar with the side surfaces 2*b*. Similarly, the foldable surface 1*b* can be collapsed and thus being folded outwardly around the wall hinge 12*b*. Then in this case, when the sideboard assembly 10 is folded to a full folded configuration, the partial walls 11*a* and 11*b* can be substantially parallel, and similarly, the partial walls 11*c* and 11*d* can be substantially parallel. But in this scenario, the partial walls 11*a*, 11*b*, 11*c* and 11*d* are not positioned between the side surfaces 2*a* and 2*b* as illustrated in FIG. 2. Instead, the partial walls 11*a*, 11*c* and the side surface 2a are substantially coplanar, and the partial walls 11b, 11d and the side surface 2b are substantially coplanar.

Figure 3:
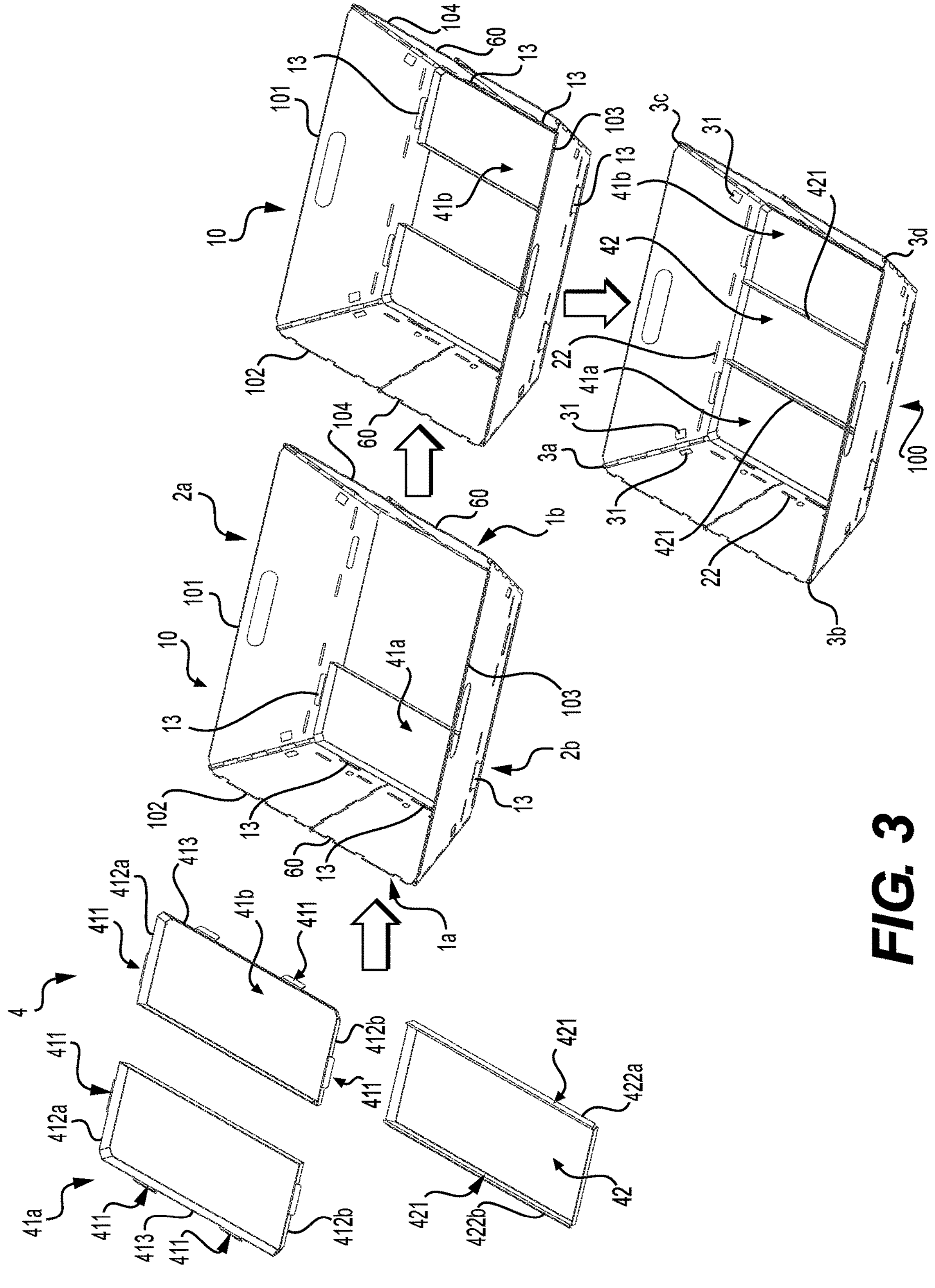
FIG. 3 shows an upper perspective view of an example bottom assembly of a foldable brazier being assembled to the sideboard assembly in steps, according to an example embodiment of the present disclosure.

FIG. 3 shows an upper perspective view of an example bottom assembly 4 of the foldable brazier 100, being assembled to the sideboard assembly 10 step by step, according to an example embodiment of the present disclosure. As illustrated in FIG. 3, the aforementioned first side section 41a can be attached to the sideboard assembly 10 first, then the second side section 41b, and lastly the intermediate section 42. In some embodiments, other feasible ways to attach the bottom assembly 4 to the sideboard assembly 10 can be used. For example, the second side section 41b can be attached first and then the first side section 41a. Referring to FIG. 3, the bottom assembly 4 or removable bottom section 4 can include the first side section 41a, the second side section 41b, and the intermediate section 42. The first side section 41a and the second side section 41b can include short edges 412a, 412b, and long edges 413. As illustrated in FIG. 3, the first side section 41a and the second side section 41b can include one or more base tabs 411 on the short edges 412a, 412b and/or the long edges 413 of the side sections of the base. The foldable surfaces 1a, 1b and side surfaces 2a, 2b can include one or more bottom support openings 13. The base tab 411 can be sized and shaped to engage with the bottom support opening 13. In this way, the first side section 41a can engage with the side surfaces 2a, 2b and foldable surface 1a of the sideboard assembly 10. Similarly, the second side section 41b can engage with the side surfaces 2a, 2b and foldable surface 1b of the sideboard assembly 10. The intermediate section 42 can include interlocking tabs 421 along each long edge 422a, 422b. The interlocking tabs 421 can overlap the corresponding edges of the first side section 41a and the second side section 41b such that each of the corresponding edges fits into the long edges 422a, 422b respectively. The interlocking tabs 421 thereby allow the intermediate section 42 to engage with the first side section 41a and the second side section 41b. In this way, the intermediate section 42 can be connected with and thus positioned between the first side section 41a and the second side section 41b via the interlocking tabs 421. Upon the bottom assembly 4 being attached to the sideboard assembly 10, a foldable brazier 100 in an unfolded, assembled configuration is obtained, as illustrated in FIG. 3. The sideboard assembly 10 can also include grill tab notches 60 along its edges 101, 102, 103, 104, which will be described in conjunction with FIG. 7.

Referring again to FIG. 3, the first side section 41a and the second side section 41b include base tabs 411 on the edges that contact the sideboard assembly 10, i.e., on the short edges 412a, 412b and the long edges 413. In this way, the removable bottom section 4 can engage with all the sidewalls of the sideboard assembly 10 (i.e., fully around its perimeter). In some embodiments, the first side section 41a and the second side section 41b can include base tabs 411 only on the opposite short edges 412a, 412b. In FIG. 3, the short edges 412a, 412b engage with the side surfaces 2a and 2b respectively. In some embodiments, the short edges 412 a, 412b can instead engage with the foldable surfaces 1a and 1b respectively. Therefore, in some embodiments, the removable bottom section 4 can be in contact with four surfaces of the sideboard assembly 10, but only engage with two of them (e.g., with the first straight sidewall 2a and the second straight sidewall 2b, or with the first foldable sidewall 1a and the second foldable sidewall 1b).

Referring again to FIG. 3, the bottom assembly 4 or removable bottom section 4 includes the first side section 41a, the second side section 41b, and the intermediate section 42. In some embodiments, the removable bottom section 4 can include more than one intermediate section 42. In such case, each intermediate section 42 can be arranged to include necessary interlocking tabs along its long edges such that the more than one intermediate section 42 can interlock each other and form a stable and substantially flat part of the bottom assembly 4 to support the fuel (e.g., coals, wood, etc.) in the foldable brazier 100. In some embodiments, the removable bottom section 4 can include only the first side section 41a and the second side section 41b. In other words, the removable bottom section 4 does not necessarily have the intermediate section 42. In this scenario, the first side section 41a and the second side section 41b can engage with each other with necessary interlocking tabs on a respective edge (not shown in the figure).

Figure 4:
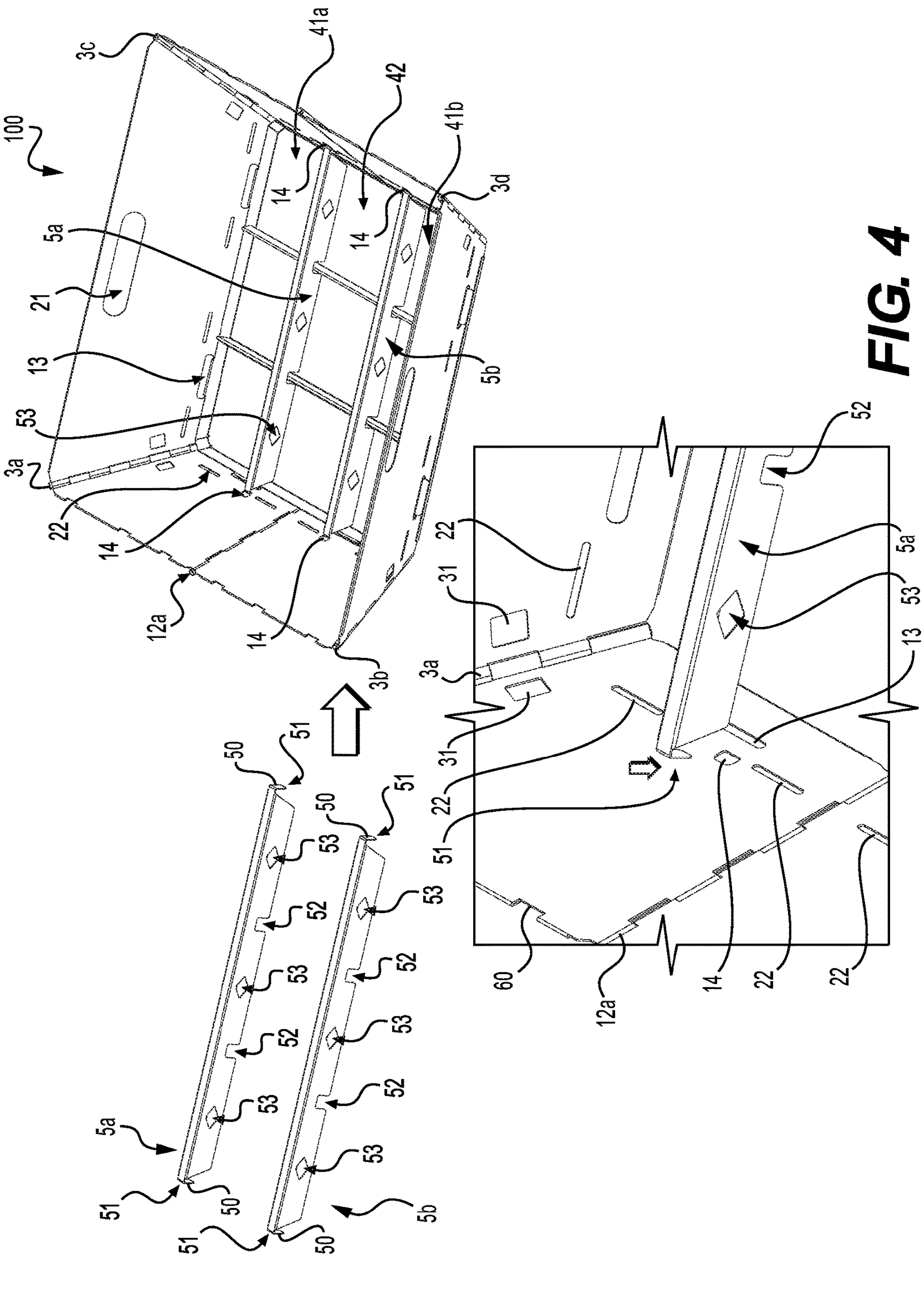
FIG. 4 shows an upper perspective view of an example foldable brazier having support braces, with a detailed view of the connection of the support braces to the foldable brazier, according to an example embodiment of the present disclosure.
Figure 5:
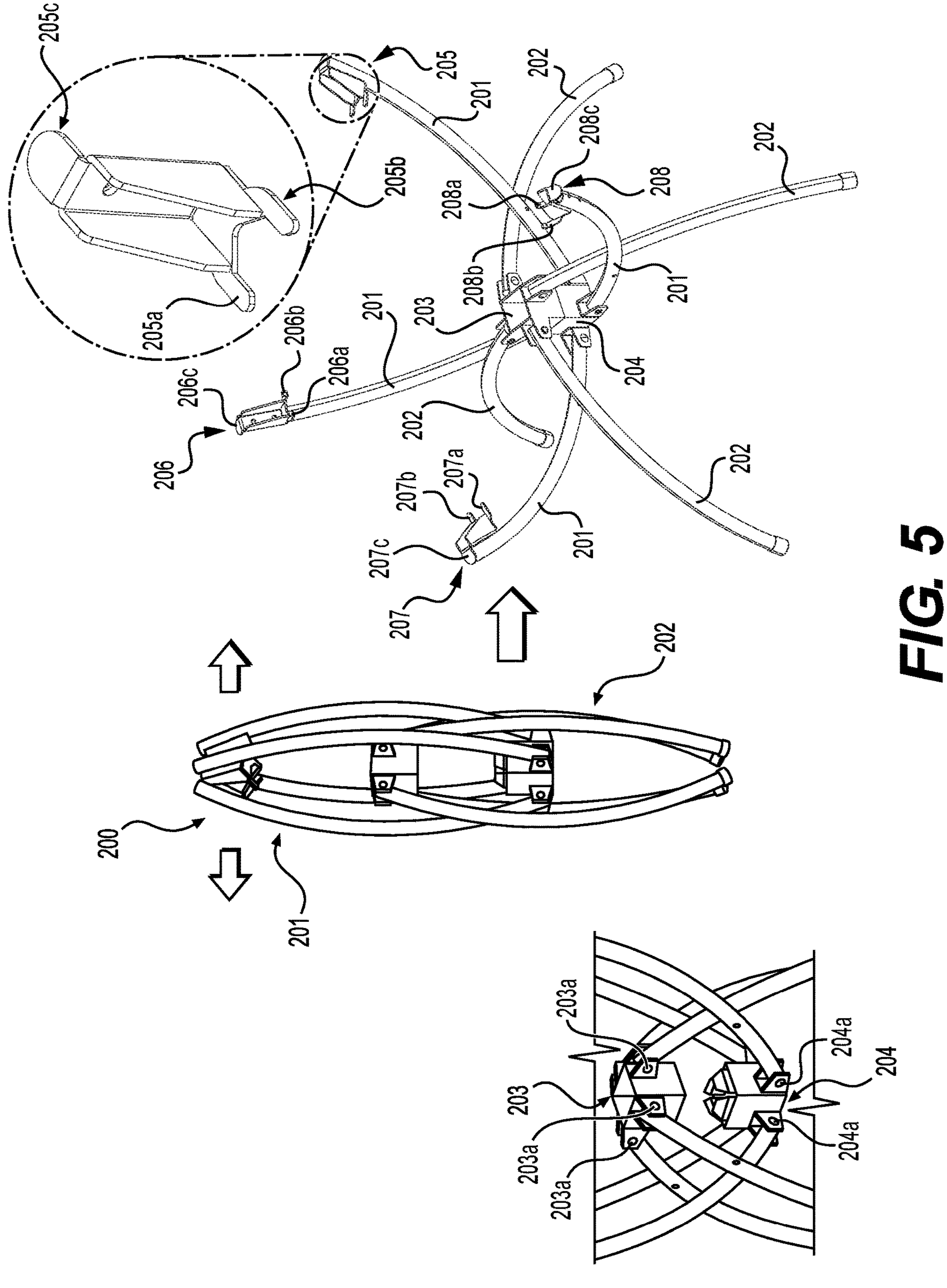
FIG. 5 shows an example base for a foldable brazier system, according to an example embodiment of the present disclosure.

FIG. 4 shows an upper perspective view of an example foldable brazier 100 having support braces 5a, 5b, according to an example embodiment of the present disclosure. Among other functionalities, the support braces 5a, 5b can enhance the stability of the removable bottom section 4. The support brace 5a, 5b can include a support tab 50 at each end 51. As illustrated in FIG. 4, the first section 11a of the first foldable sidewall 1a can include a support tab aperture 14. The third section 11c of the second foldable sidewall 1b can also include a support tab aperture 14. The support tabs 50 are sized and shaped to engage with the support tab apertures 14. Therefore, the support tabs 50 of the support brace 5a can engage with the corresponding support tab apertures 14 on the first section 11a and third section 11c, respectively, as illustrated in the detailed view of FIG. 4. Similarly, the second section 11b of the first foldable sidewall 1a and the fourth section 11d of the second foldable sidewall 1b can include a support tab aperture 14, allowing the support tabs 50 of the support brace 5b to engage with the corresponding support tab apertures 14, respectively. The support brace 5a, 5b can include one or more avoidance notches 52. The avoidance notch 52 is positioned to correspond to a location of the one or more interlocking tabs 421, and the avoidance notch 52 is sized to fit over the interlocking tabs 421. As such, the support brace 5a, 5b will avoid the interlocking tab 421, and therefore a bottom of the support brace 5a, 5b can contact and sit flush upon the removable bottom section 4. In some embodiments, the support brace 5a, 5b can include one or more vents 53 to facilitate air circulation through the bottom of the removable bottom section 4. As illustrated in FIG. 4, two support braces 5a, 5b are arranged in the foldable brazier 100. In some embodiments, more or less support braces can be arranged in the foldable brazier 100. For example, for the benefit of stability, in a case where the removable bottom section 4 includes only the first side section 41a and the second side section 41b (i.e., there is no intermediate section 42), then only a single support brace 5a, 5b may be sufficient for the foldable brazier 100. As another example, more support braces may be arranged in the foldable brazier 100 as needed. In some embodiments, support brace 5a, 5b can engage with the side surfaces 2a, 2b via corresponding support tab apertures 14 thereof.

FIG. 5 shows an upper perspective view of an example base 200 of the foldable brazier system 400, according to an example embodiment of the present disclosure. The base 200 can include a first set of legs 201, which includes four legs 201 in total, as illustrated in FIG. 5. Similarly, the base 200 can include a second set of legs 202, which includes four legs 202 in total, as illustrated in FIG. 5. The first set of legs 201 can be connected to a lower connection joint 204 via a plurality of leg pins 204a. The leg pins 204a allow the first set of legs 201 to pivot with respect to each other. The second set of legs 202 can be connected to an upper connection joint 203 via a plurality of leg pins 203*a*. The leg pins 203*a* allow the second set of legs 202 to pivot with respect to each other. Therefore, the base 200 can have a folded configuration. In this folded configuration, the first set of legs 201 can be folded upwardly and inwardly by sliding down the lower connection joint 204, whereas the second set of legs 202 can be folded downwardly and inwardly by sliding up the upper connection joint 203, as illustrated in FIG. 5. The base 200 can also have an unfolded configuration. In this unfolded configuration, the first set of legs 201 can be unfolded downwardly and outwardly by sliding up the lower connection joint 204, and the second set of legs 202 can be unfolded upwardly and outwardly by sliding down the upper connection joint 203. In this way, the first and second set of legs 201 and 202 can be fully unfolded such that the upper connection joint 203 and the lower connection joint 204 being in contact with each other. In some embodiments, depending on the type of joints being used, the upper connection joint 203 and the lower connection joint 204 can engage with each other. As illustrated in FIG. 5, each leg 201 can include a corner bracket 205, 206, 207, 208. Each corner bracket 205, 206, 207, 208 can include a base support tab 205*c*, 206*c*, 207*c*, 208*c* to fix each corner bracket 205, 206, 207, 208 onto the top of a corresponding leg 201. Each corner bracket 205, 206, 207, 208 can include a first corner tab 205*a*, 206*a*, 207*a*, 208*a* and a second corner tab 205*b*, 206*b*, 207*b*, 208*b*, respectively, which will be described in conjunction with FIG. 6.

Figure 6:
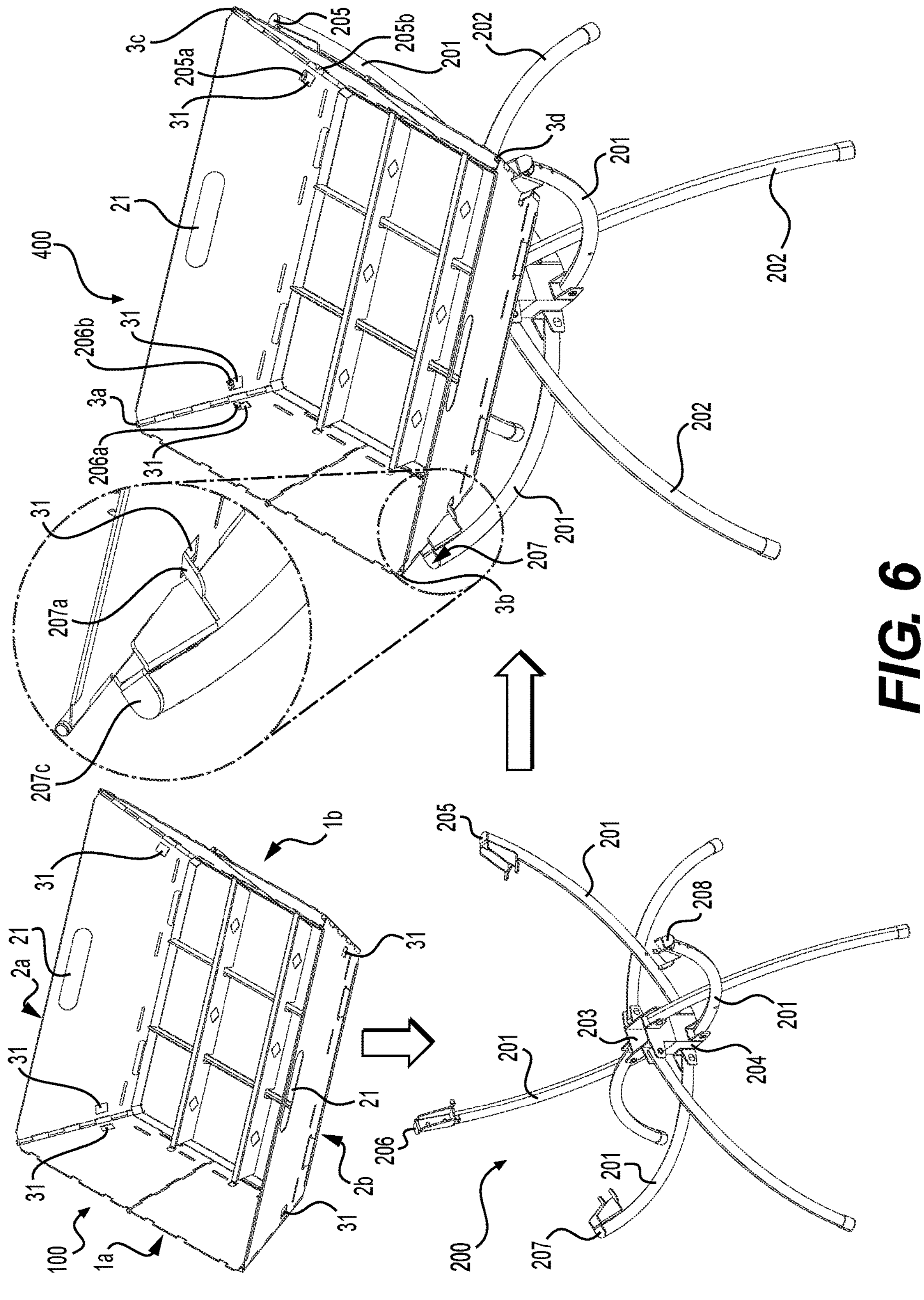
FIG. 6 shows an upper perspective view of an example foldable brazier system, with a detailed view of the connection of the foldable brazier to the base, according to an example embodiment of the present disclosure.

FIG. 6 shows an upper perspective view of an example foldable brazier system 400, with a detailed view of the connection of the foldable brazier 100 to the base 200, according to an example embodiment of the present disclosure. As illustrated in FIG. 6, the first foldable sidewall 1*a* can include two bracket apertures 31, one proximate the corner hinge 3*a* and the other proximate the corner hinge 3*b*. Similarly, the second foldable sidewall 1*b* can include two bracket apertures 31, one proximate the corner hinge 3*c* and the other one proximate the corner hinge 3*d*. The first straight sidewall 2*a* can include two bracket apertures 31, one proximate the corner hinge 3*a* and the other one proximate the corner hinge 3*c*. The second straight sidewall 2*b* can include two bracket apertures 31, one proximate the corner hinge 3*b* and the other one proximate the corner hinge 3*d*. The first corner tab 205*a*, 206*a*, 207*a*, 208*a* and the second corner tab 205*b*, 206*b*, 207*b*, 208*b* can be sized and shaped to engage with one bracket aperture 31. In this way, for each corner bracket 205, 206, 207, 208, the respective first corner tab 205*a*, 206*a*, 207*a*, 208*a* and second corner tab 205*b*, 206*b*, 207*b*, 208*b* can straddle one corner hinge 3*a*, 3*b*, 3*c*, or 3*d*. Thus, the foldable brazier 100 can be hooked onto the base 200. In some embodiments, two legs 201 of the base 200 can include a corner bracket. In this scenario, each side surface 2*a*, 2*b* and each foldable surface 1*a*, 1*b* of the foldable brazier 100 can include one bracket aperture 31. For example, the first foldable sidewall 1*a* can include one bracket aperture 31 proximate the first corner hinge 3*a*, the first straight sidewall 2*a* can include one bracket aperture 31 proximate the first corner hinge 3*a*. Similarly, the second foldable sidewall 1*b* can include one bracket aperture 31 proximate the fourth corner hinge 3*d*, and the second straight sidewall 2*b* can include one bracket aperture 31 proximate the fourth corner hinge 3*d*. In this way, the foldable brazier 100 can include diagonally positioned bracket apertures 31 such that it's being hooked onto the base 200 on two diagonal corners. In some embodiments, such diagonally positioned brackets apertures 31 can be deployed proximate the second and third corner hinges 3*b*, 3*c*.

Figure 7:
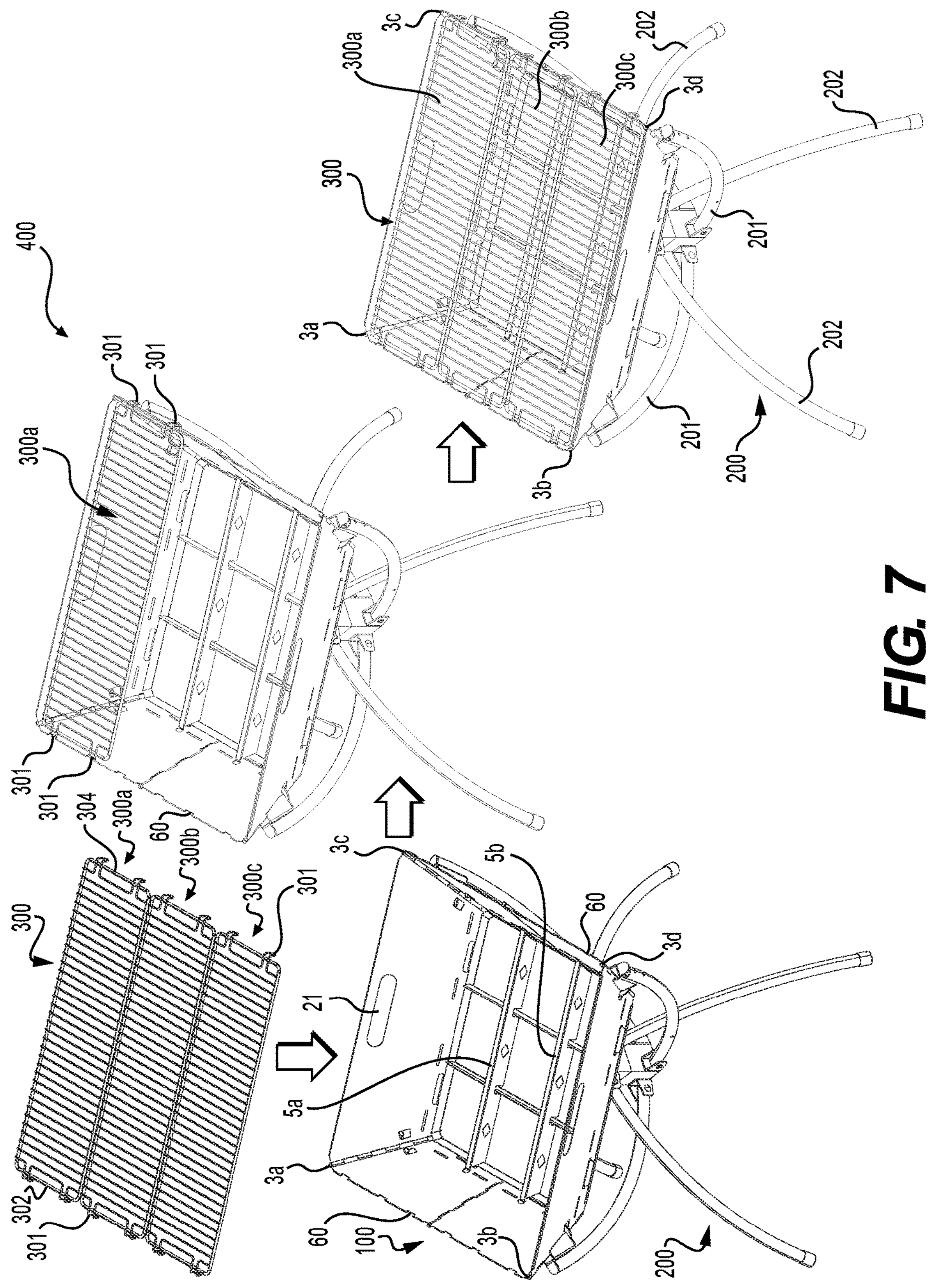
FIG. 7 shows an upper perspective view of an example foldable brazier system having a grill plate set, according to an example embodiment of the present disclosure.

In some embodiments, instead of having two sets of legs 201, 202 as illustrated in FIG. 7, the base 200 can include merely one set of legs (not shown in the figures). In this scenario, the base 200 can have a folded and unfolded configuration with appropriate designs. Alternatively, the base 200 can also have only unfolded configuration, depending on the specific manufactural design and needs.

FIG. 7 shows an upper perspective view of an example foldable brazier system 400 having a grill plate set 300, according to an example embodiment of the present disclosure. As illustrated in FIG. 7, the grill plate set 300 can include three grill plates 300*a*, 300*b*, 300*c*, though this is merely illustrative as the system 400 could include more or less than three grill plates. Each grill plate 300*a*, 300*b*, 300*c* can include opposite edges 302, 304 to rest upon the foldable brazier 100. Each grill plate 300*a*, 300*b*, 300*c* can include one or more grill tabs 301 along the opposite edges 302, 304. The foldable surfaces 1*a*, 1*b* of the foldable brazier 100 can include one or more grill tab notches 60. The grill tabs 301 can be sized and shaped to engage with the grill tab notches 60. The grill plates 300*a*, 300*b*, 300*c* can be placed on top of the foldable brazier 100 piece by piece, such that each grill tab 301 engages with a corresponding grill tab notch. In some embodiments, the side surfaces 2*a*, 2*b* instead of the foldable surfaces 1*a*, 1*b*, can include one or more grill tab notches 60 to be engaged with a corresponding grill tab 301 of the grill plate set 300. In some embodiments, more than two edges 101, 102, 103, 104 of the foldable brazier 100 can include the grill tab notches 60 (e.g., three or all four edges) to be engaged with a corresponding grill tab 301 of the grill plate set 300.

Figure 8:
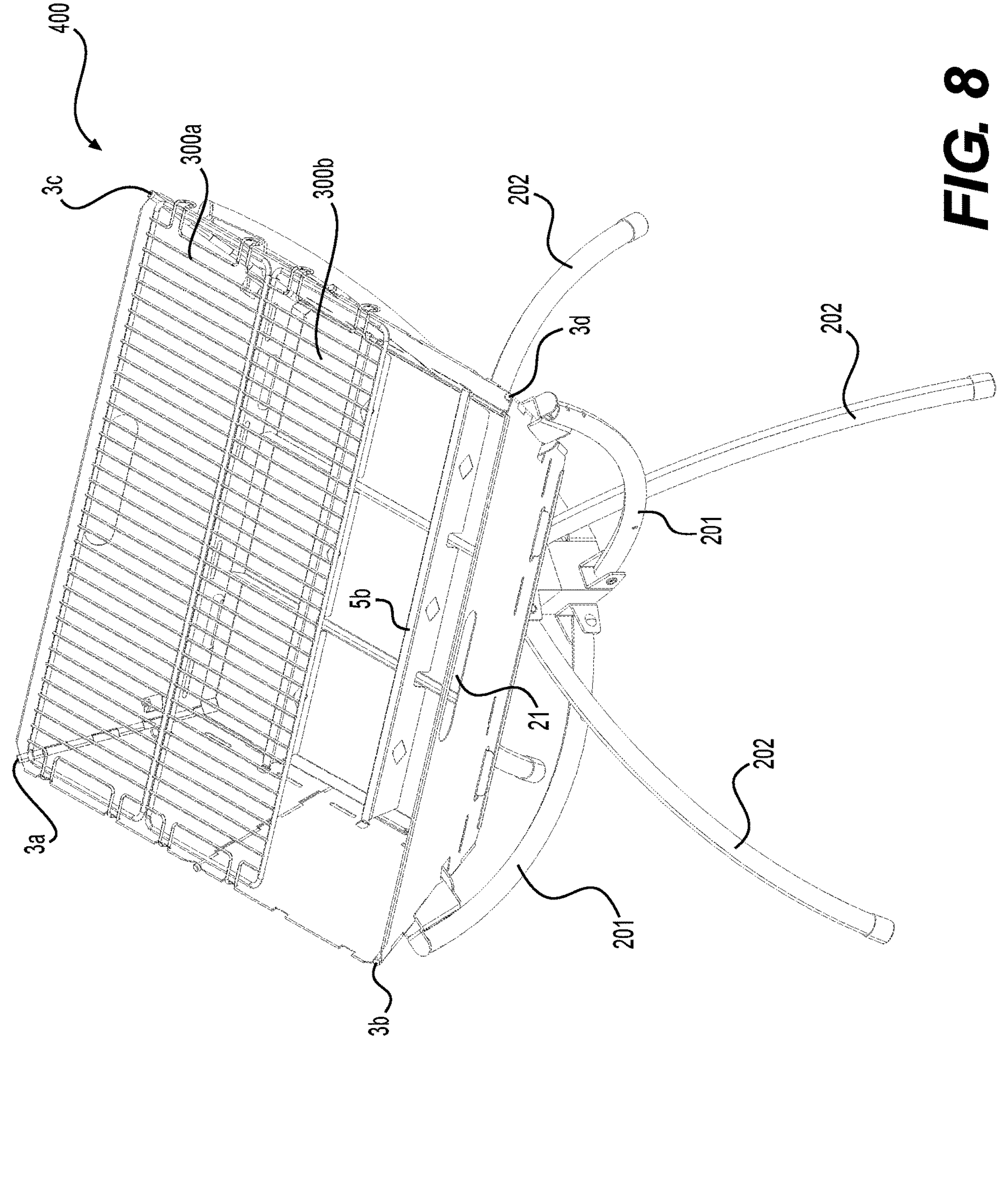
FIG. 8 shows an upper perspective view of an example foldable brazier system having a grill plate set which is removable as needed, according to an example embodiment of the present disclosure.

FIG. 8 shows an upper perspective view of an example foldable brazier system 400 having a grill plate set 300 which is removable as needed, according to an example embodiment of the present disclosure. During use, wood coal or other heating materials can be placed into the foldable brazier 100 to provide a heating source. Meat, vegetables or any other kind of food that to be heated can be placed on the grill plate set 300. When there is a need to add or replace the coal, or need to be firing or put out the fire, instead of removing the whole grill plate set 300, one or more pieces of the grill plate 300*a*, 300*b*, 300*c* can be removed.

Aspects of the invention are also provided by the following numbered clauses:

Clause 1. A foldable brazier (100), comprising: a bottom assembly (4); and a sideboard assembly (10) comprising two oppositely arranged foldable surfaces (1*a*, 1*b*) and two oppositely arranged side surfaces (2*a*, 2*b*), the foldable surfaces (1*a*, 1*b*) and the side surfaces (2*a*, 2*b*) being arranged alternatively, the foldable surfaces (1*a*, 1*b*) and the side surfaces (2*a*, 2*b*) being hingeably connected via corner hinges (3*a*, 3*b*, 3*c*, 3*d*), the foldable surfaces (1*a*, 1*b*) comprising two partial walls (11*a*, 11*b*, 11*c*, 11*d*) being hingeably connected with wall hinges (12*a*, 12*b*), wherein the bottom assembly (4) is engageable with the sideboard assembly (10).

Clause 2. The foldable brazier of Clause 1, wherein the bottom assembly (4) comprises two side shell bodies (41*a*, 41*b*) and a middle shell body (42), the middle shell body (42) engaged with the two side shell bodies (41*a*, 41*b*), the two side shell bodies (41*a*, 41*b*) engaged with the sideboard assembly (10).

Clause 3. The foldable brazier of Clause 2, wherein a plurality of bottom support openings (13) are arranged on the foldable surfaces (1*a*, 1*b*) and the side surfaces (2*a*, 2*b*), and wherein a plurality of base tabs (411) corresponding to and engageable with the bottom support openings (13) are arranged on the side shell bodies (41*a*, 41*b*).

Clause 4. The foldable brazier of Clause 2 or 3, wherein interlocking tabs (421) are positioned on both sides of the middle shell body (42), the interlocking tabs (421) being engageable with the two side shell bodies (41*a*, 41*b*).

Clause 5. The foldable brazier of any of Clauses 2 to 4, wherein the bottom assembly (4) further comprises a plurality of support braces (5*a*, 5*b*), and wherein the support braces (5*a*, 5*b*) are arranged parallel to the two side surfaces (2*a*, 2*b*).

Clause 6. The foldable brazier of Clause 5, wherein support tabs (51) are positioned on two ends (50) of each of the support braces (5*a*, 5*b*), and a plurality of support tab apertures (14) corresponding to the support tabs (51) are arranged on the foldable surfaces (1*a*, 1*b*).

Clause 7. The foldable brazier of Clause 5 or 6, wherein a plurality of avoidance notches (52) are positioned in the support braces (5*a*, 5*b*) so that the support braces (5*a*, 5*b*) are in contact with the bottom assembly (4).

Clause 8. The foldable brazier of Clause 5, wherein a plurality of vents (53) are positioned in the support braces (5*a*, 5*b*).

Clause 9. The foldable brazier of any of the preceding Clauses, wherein gripping openings (21) are provided on the side surfaces (2*a*, 2*b*).

Clause 10. The foldable brazier of any of the preceding Clauses, wherein a plurality of air openings (22) are provided on each of the foldable surfaces (1*a*, 1*b*) and the side surfaces (2*a*, 2*b*).

Clause 11. A foldable brazier (100), comprising: a first straight sidewall (2*a*); a second straight sidewall (2*b*); a first foldable sidewall (1*a*) comprising a first section (11*a*) and a second section (11*b*) hingeably connected to each other via a first wall hinge (12*a*); a second foldable sidewall (1*b*) comprising a third section (11*c*) and a fourth section (11*d*) hingeably connected to each other via a second wall hinge (12*b*); and a removable bottom section (4), wherein the first section (11*a*) is hingeably connected to the first straight sidewall (2*a*) via a first corner hinge (3*a*), the second section (11*b*) is hingeably connected to the second straight sidewall (2*b*) via a second corner hinge (3*b*), the third section (11*c*) is hingeably connected to the first straight sidewall (2*a*) via a third corner hinge (3*c*), and the fourth section (11*d*) is hingeably connected to the second straight sidewall (2*b*) via a fourth corner hinge (3*d*), wherein the foldable brazier (100) has a folded configuration in which the two foldable sidewalls (1*a*, 1*b*) are collapsed at the first and second wall hinges (12*a*, 12*b*) and are positioned between the first and second straight sidewalls (2*a*, 2*b*), and wherein the foldable brazier (100) has an unfolded configuration in which the first section (11*a*) and the second section (11*b*) are substantially coplanar, the third section (11*c*) and the fourth section (11*d*) are substantially coplanar, and the bottom section (4) is attached to at least two of the first straight sidewall (2*a*), the second straight sidewall (2*b*), the first foldable sidewall (1*a*), and the second foldable sidewall (1*b*).

Clause 12. The foldable brazier of Clause 11, wherein the bottom section (4) comprises a first side section (41*a*) and a second side section (41*b*).

Clause 13. The foldable brazier of Clause 12, wherein: the first side section (41*a*) and the second side section (41*a*) each comprise at least one base tab (411); and at least one of: the first and second straight sidewalls (2*a*, 2*b*) each further comprises a corresponding bottom support opening (13), the at least one base tab (411) being sized and shaped to engage with the bottom support opening (13); or the first and second foldable sidewalls (1*a*, 1*b*) each further comprises a corresponding bottom support opening (13), the at least one base tab (411) being sized and shaped to engage with the bottom support opening (13).

Clause 14. The foldable brazier of Clause 12 or 13, wherein: the first side section (41*a*) and the second side section (41*a*) each comprises base tabs (411) extending therefrom; and the first straight sidewall (2*a*), the second straight sidewall (2*b*), the first foldable sidewall (1*a*), and the second foldable sidewall (1*b*) each comprises corresponding bottom support openings (13) engageable with the base tabs (411).

Clause 15. The foldable brazier of Clause 14, wherein the bottom section (4) further comprises an intermediate section (42) positionable between the first side section (41*a*) and the second side section (41*b*), the intermediate section (42) comprising interlocking tabs (421) along each of its long edges (422*a*, 422*b*) so that the intermediate section (42) is connectable with the first side section (41*a*) and the second side section (41*b*).

Clause 16. The foldable brazier of Clause 15, further comprising a support brace (5*a*, 5*b*) comprising: a support tab (51) at each end (50) of the support brace (5*a*, 5*b*); and an avoidance notch (52) positioned to correspond to a location of the interlocking tab (421); wherein the first and second straight sidewalls (2*a*, 2*b*) or the first and second foldable sidewalls (1*a*, 1*b*) each further comprises a support tab aperture (14), the support tab (51) being sized and shape to engage with the support tab aperture (14).

Clause 17. The foldable brazier of any of Clauses 11 to 16, further comprising at least one grill plate (300*a*, 300*b*, 300*c*), comprising grill tabs (301) along each of two opposite edges (302, 304), wherein the first and second foldable sidewalls (1*a*, 1*b*) or the first and second straight sidewalls (2*a*, 2*b*) each further comprises grill tab notches (60), the grill tabs (301) being sized and shaped to engage with the grill tab notches (60).

Clause 18. A foldable brazier system (400), comprising: a foldable brazier (100), comprising, a first straight sidewall (2*a*) comprising one or more bracket apertures (31); a second straight sidewall (2*b*) comprising one or more bracket apertures (31); a first foldable sidewall (1*a*) comprising a first section (11*a*) and a second section (11*b*) hingeably connected to each other via a first wall hinge (12*a*), the first foldable sidewall (1*a*) further comprising one or more bracket apertures (31); and a second foldable sidewall (1*b*) comprising a third section (11*c*) and a fourth section (11*d*) hingeably connected to each other via a second wall hinge (12*b*), the second foldable sidewall (1*b*) further comprising one or more bracket apertures (31); and a removable bottom section (4); and a base (200) comprising a plurality of corner brackets (205, 206, 207, 208), each corner bracket comprising a first corner tab (205*a*, 206*a*, 207*a*, 208*a*) and a second corner tab (205*b*, 206*b*, 207*b*, 208*b*), wherein the first section (11*a*) is hingeably connected to the first straight sidewall (2*a*) via a first corner hinge (3*a*), the second section (11*b*) is hingeably connected to the second straight sidewall (2*b*) via a second corner hinge (3*b*), the third section (11*c*) is hingeably connected to the first straight sidewall (2*a*) via a third corner hinge (3*c*), and the fourth section (11*d*) is hingeably connected to the second straight sidewall (2*b*) via a fourth corner hinge (3*d*), wherein the first corner tab (205*a*, 206*a*, 207*a*, 208*a*) is sized and shaped to engage with one bracket aperture (31), the second corner tab (205*b*, 206*b*, 207*b*, 208*b*) is sized and shaped to engage with one bracket aperture (31), and each of the plurality of corner brackets (205, 206, 207, 208) are positioned on the base (200) such that their respective first corner tab (205*a*, 206*a*, 207*a*, 208*a*) and second corner tab (205*b*, 206*b*, 207*b*, 208*b*) straddle one of the first corner hinge (3*a*), the second corner hinge (3*b*), the third corner hinge (3*c*), or the fourth corner hinge (3*d*).

Clause 19. The foldable brazier system of Clause 18, wherein: the foldable brazier (100) has a folded configuration in which the two foldable sidewalls (1*a*, 1*b*) are collapsed at the first and second wall hinges (12*a*, 12*b*) and are positioned between the first and second straight sidewalls (2*a*, 2*b*), and wherein the foldable brazier (100) has an unfolded configuration in which the first section (11*a*) and the second section (11*b*) are substantially coplanar, the third section (11*c*) and the fourth section (11*d*) are substantially coplanar, and the bottom section (4) is attached to at least two of the first straight sidewall (2*a*), the second straight sidewall (2*b*), the first foldable sidewall (1*a*), and the second foldable sidewall (1*b*).

Clause 20. The foldable brazier system of Clause 18 or 19, further comprising a grill plate (300*a*, 300*b*, 300*c*) comprising a plurality of grill tabs (301), wherein the first and second foldable sidewalls (1*a*, 1*b*) or the first and second straight sidewalls (2*a*, 2*b*) each further comprises grill tab notches (60), the plurality of grill tabs (301) being sized and shaped to engage with the grill tab notches (60).

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, and systems for carrying out the several purposes of the embodiments and claims presented in this application. It is important, therefore, that the claims be regarded as including such equivalent constructions.

Furthermore, the purpose of the foregoing Abstract is to enable the public, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A foldable brazier system, comprising:

a foldable brazier, comprising, a first straight sidewall comprising one or more bracket apertures;

a second straight sidewall comprising one or more bracket apertures;

a first foldable sidewall comprising a first section and a second section hingeably connected to each other via a first wall hinge, the first foldable sidewall further comprising one or more bracket apertures; and a second foldable sidewall comprising a third section and a fourth section hingeably connected to each other via a second wall hinge, the second foldable sidewall further comprising one or more bracket apertures; and a removable bottom section; and a base comprising a plurality of corner brackets, each corner bracket comprising a first corner tab and a second corner tab, wherein the first section is hingeably connected to the first straight sidewall via a first corner hinge, the second section is hingeably connected to the second straight sidewall via a second corner hinge, the third section is hingeably connected to the first straight sidewall via a third corner hinge, and the fourth section is hingeably connected to the second straight sidewall via a fourth corner hinge, wherein the first corner tab is sized and shaped to engage with one bracket aperture, the second corner tab is sized and shaped to engage with one bracket aperture, and each of the plurality of corner brackets are positioned on the base such that their respective first corner tab and second corner tab straddle one of the first corner hinge, the second corner hinge, the third corner hinge, or the fourth corner hinge.

2. The foldable brazier system of claim 1, wherein:

the foldable brazier has a folded configuration in which the two foldable sidewalls are collapsed at the first and second wall hinges and are positioned between the first and second straight sidewalls, and wherein the foldable brazier has an unfolded configuration in which the first section and the second section are substantially coplanar, the third section and the fourth section are substantially coplanar, and the bottom section is attached to at least two of the first straight sidewall, the second straight sidewall, the first foldable sidewall, and the second foldable sidewall.

3. The foldable brazier system of claim 1, further comprising a grill plate comprising a plurality of grill tabs, wherein the first and second foldable sidewalls or the first and second straight sidewalls each further comprises grill tab notches, the plurality of grill tabs being sized and shaped to engage with the grill tab notches.

* * * * *